Figure 1:
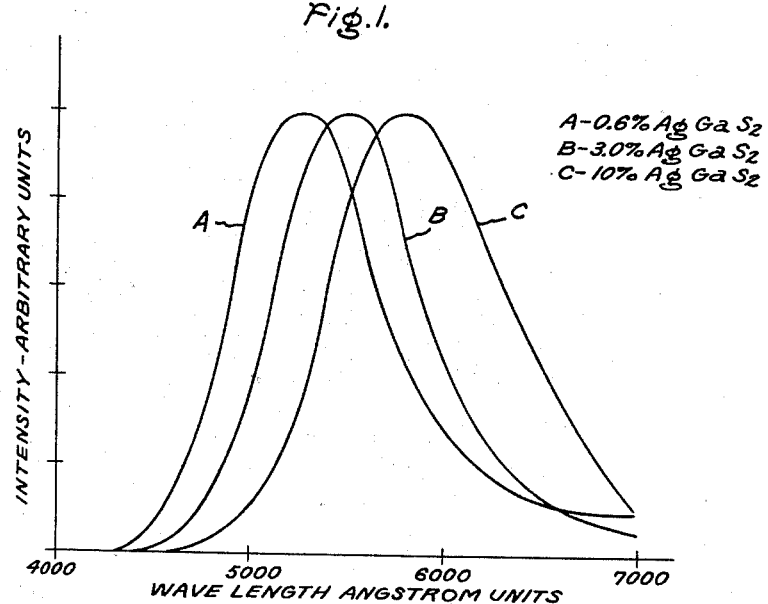

Inventor:
Eugene F. Apple,
by Paul A. Frank
His Attorney.

United States Patent Office 2,947,704
Patented Aug. 2, 1960

2,947,704
LUMINESCENT ZINC SULFIDE PHOSPHORS AND THE PREPARATION THEREOF

Eugene F. Apple, Schenectady, N.Y., assignor to General Electric Company, a corporation of New York Filed Apr. 10, 1957, Ser. No. 651,871

8 Claims. (Cl. 252—301.6)

The present invention relates to improved methods for preparing zinc sulfide phosphors and to phosphors produced thereby.

It is well known that luminescent materials may be produced by adding minor quantities of metallic activator materials, such as silver, to zinc sulfide. In addition to a metallic activator, a co-activator such as a monovalent anion, for example, chloride or a trivalent cation, for example gallium, are also generally added. These activators and co-activators enter the zinc sulfide crystal lattice and replace zinc atoms forming "centers of activation" which are reponsible for luminescent emission. The activator and co-activator should be present within the crystal lattice in approximately the same concentration for maximum efficiency.

When an activator such as silver, and a co-activator such as gallium, are added to zinc sulfide in elemental form or in the form of a water-soluble or oxygen-containing salt it is extremely difficult to cause high concentrations thereof to enter the zinc sulfide crystal lattice substitutionally. Additionally, it is extremely difficult to control the activator and co-activator concentration so that both are present in approximately the same concentration. Furthermore, zinc sulfide phosphors prepared by conventional methods often suffer deleterious effects because of oxygen inclusions due to the use of water slurries or oxygen-containing salts.

Accordingly, one object of the present invention is to provide a method of preparing silver- and gallium-activated zinc sulfide phosphors containing high concentrations of activator and co-activator atoms.

A further object of the invention is to provide a method for preparing silver- and gallium-activated zinc sulfide phosphors having closely controlled and equal concentrations of activator and co-activator atoms therein.

Another object is to provide a method for preparing oxygen-free zinc sulfide phosphors.

Still another object of the invention is to provide improved silver- and gallium-activated zinc phosphors and an improved method for the preparation thereof.

Figure 2:
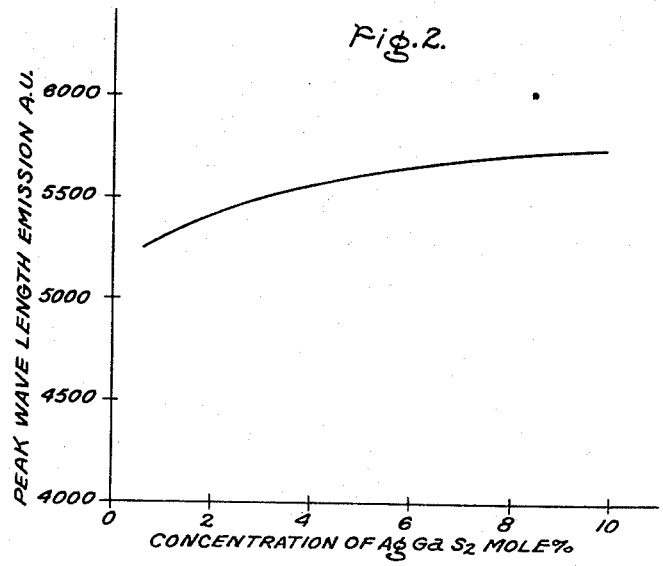

Briefly stated, in accord with the invention, improved silver and gallium activated zinc sulfide phosphors are prepared by firing weighted mixtures of silver-gallium sulfide ($AgGaS_2$) and zinc sulfide in a reducing atmosphere. Because of the great similarity of the crystalline structure of these two sulfides, they form a series of solid solutions. By virtue of this characteristic, greater concentrations of silver and gallium may be substitutionally incorporated within the resultant phosphors than have heretofore been obtainable. Because of these greater concentrations, phosphors produced by this method containing high activator concentrations, exhibit an overall green or yellow emission not heretofore obtainable from silver and gallium activated zinc sulfide phosphors. The novel features believed characteristic of the invention are set forth in the appended claims. The invention itself, together with further objects and advantages thereof, may best be understood by reference to the following description taken in connection with the attached drawing in which;

Figure 1 is a graphical representation of the emission of three typical phosphors prepared in accord with the invention, and Figure 2 is a graphical representation of the peak emission of green and yellow emitting phosphors prepared in accord with the invention as a function of the percentage of silver-gallium sulfide utilized.

Luminescent zinc sulfide phosphors are generally known to exist in two crystalline structures. The first of these is the cubic or zinc blende (sphalerite) crystalline structure and the second is the hexagonal (wurtzite) structure. The present invention is concerned only with cubic zinc sulfide or zinc blende luminescent phosphors. Cubic zinc sulfide possesses a diamond-type crystal lattice structure. This structure comprises two interpenetrating face centered cubic lattices. In this structure, alternate atoms of the crystal lattice comprise zinc atoms and the remainder are sulfur. Thus, each zinc atom is tetrahedrally surrounded by four sulfur atoms and each sulfur atom is tetrahedrally surrounded by four zinc atoms. In silver and gallium activated cubic zinc sulfide phosphors, a silver atom substitutes for a zinc atom and a gallium atom substitutes for a neighboring zinc atom within the lattice. The adjacent silver and gallium atoms maintain electrical balance within the lattice, but may undergo an energy change when subjected to radiant energy or cathode rays, and at a later time, undergo a second energy change with a consequent emission of visible light.

Heretofore, silver and gallium have been added to zinc sulfide to form silver and gallium activated zinc sulfide phosphors by adding silver and gallium in water soluble salts or in a water slurry thereof to the zinc sulfide prior to firing. Upon firing, a small amount of the silver and gallium present enters the lattice substitutionally. It has been impossible, heretofore, to cause large concentrations of silver and gallium to enter the crystal lattice by these methods. Although the exact reason for this is not understood, the maximum concentrations of silver which have been reported as substitutionally present in zinc sulfide phosphors is approximately 0.1% by weight and the maximum reported concentration of gallium as an activator in zinc sulfide is of the order of 0.01% by weight. Therefore, while my invention may be practiced utilizing as little as 0.01 mole percent of silver-gallium sulfide, it is particularly useful utilizing from 0.6 to 10 mole percent of silver-gallium sulfide, since these percentages result in the formation of a new system of phosphors.

The compound silver-gallium sulfide ($AgGaS_2$) is structurally similar to zinc blende and possesses the same tetrahedral configuration of atoms. In silver-gallium sulfide the sulfur atoms have the same position as in cubic zinc sulfide but the zinc atoms are replaced by alternate silver and gallium atoms. I have found that when silver-gallium sulfide and zinc sulfide are fired together after intimate mixture as by ball milling, these two compounds form a series of solid solutions up to 10 mole percent $AgGaS_2$.

By virtue of this characteristic, I have been able to form silver and gallium activated zinc sulfide phosphors having a higher concentration of silver and gallium therein than has been heretofore obtainable by prior art methods for producing zinc sulfide phosphors. This higher concentration of silver and gallium within the zinc sulfide lattice results, among other things, in a different emission spectrum than has heretofore been observed in silver and gallium zinc sulfide phosphors. In general, the phosphors of the invention are produced by firing from 0.01 to 10 mole percent of silver-gallium sulfide with zinc sulfide in a reducing atmosphere at a temperature from 800° C. to 1000° C. Phosphors produced by this method utilizing from 0.01 to 0.1 mole percent of silver-gallium sulfide exhibit blue luminescence. Phosphors produced by this method utilizing from 0.6 to 10 mole percent of silver-gallium sulfide exhibit green or yellow luminescence. The method of the invention is of particular utility in this latter range, since green and yellow luminescent phosphors activated with silver and gallium sulfide have not been produced heretofore.

Silver-gallium sulfide, used in the preparation of phosphors of the present invention may be prepared by mixing stoichiometric quantities of silver sulfide ($Ag_2S$) and gallium sulfide ($Ga_2S_3$) for example by grinding and ball milling. The mixture of these sulfides is then fired in a reducing atmosphere, which may for example be hydrogen sulfide, at approximately 800° for several hours. The resulting product (silver-gallium sulfide) is yellow-green in color as compared with the gray color exhibited by a mixture of silver sulfide and gallium sulfide prior to firing. X-ray diffraction studies of the silver-gallium sulfide, prepared as described above, show that the salt possesses a tetragonal crystal structure which is closely related to the cubic zinc blende structure.

In preparing silver and gallium activated zinc sulfide phosphors in accord with the present invention, approximately 0.01 to 10 mole percent of silver-gallium sulfide is mixed with luminescent-grade cubic zinc sulfide and, after mixture by ball milling, the mixed sulfides are fired in a reducing atmosphere, for example, hydrogen sulfide or hydrogen, at a temperature of 800° C. to 1000° C. and preferably from 900° C. to 975° C. for approximately one-half to two hours. Although luminescent silver and gallium activated zinc sulfide phosphors may be prepared by firing quantities of sulfide containing less than 0.6 mole percent of silver-gallium sulfide, the present invention is of greatest utility when practiced utilizing 0.6 to 10 mole percent of silver-gallium sulfide, since in this range the process results in the preparation of luminescent phosphors containing concentrations of silver and gallium not heretofore obtainable. Accordingly, the preferred concentration of silver-gallium sulfide which is utilized in accord with the present invention is from 0.6 to 10 mole percent. The resultant phosphors then contain from 0.6 to 10 gram-atomic percent each of silver and gallium.

The temperature at which the mixed sulfides are fired must be no higher than 1000° C. since at temperatures greater than 1020° C. the cubic zinc blende structure is transformed into the hexagonal or wurtzite form of zinc sulfide and the mutual solubility of the silver gallium sulfide and the zinc sulfide may be lost. Phosphors prepared by firing mixtures of silver-gallium sulfide and zinc sulfide at temperatures in excess of 1000° C. have resulted in inferior products which show spotty, low brightness luminescence. Firing must be conducted at a temperature in excess of 800° C. or the mixed sulfides do not properly form solid solutions. The optimum results, insofar as brightness and uniformity of the resultant phosphors are concerned, are obtained when the sulfides are fired at from 900° C. to 975° C. for approximately one-half to two hours. At least one-half hour is required. Although the firing may be conducted for greater lengths of time than two hours without detrimental effects, no great advantage is secured thereby. Phosphors prepared in accord with the invention exhibit a maximum brightness when the starting mixture contains approximately 5 mole percent of silver-gallium sulfide, resulting in a zinc sulfide phosphor containing approximately 5 gram-atomic percent each of silver and gallium.

In Figure 1 of the drawing there are illustrated typical emission curves of three silver gallium activated zinc sulfide phosphors prepared in accord with the present invention. As may be seen from these curves, the emission of the phosphors, which in this case are prepared by firing 0.6, 3.0, and 10.0 mole percent, respectively, of silver-gallium sulfide with zinc sulfide in an atmosphere of hydrogen sulfide, have a rather sharply peaked emission, peaked in the green and yellow portions of the visible spectrum. This is in contrast to previously reported silver and gallium activated zinc sulfide phosphors which generally luminesce in the blue portion of the visible spectrum. Although an emission peak of 5700 A.U. has been reported for extremely low concentrations of silver and gallium activated zinc sulfide, this peak is an extremely low intensity peak which is barely discernible, and which contributes very little to the total emission of the phosphor which is generally blue. The total emission of the phosphors, the characteristics of which are represented by Figure 1 of the drawing, however, peak at approximately 5300 A.U., 5500 A.U., and 5800 A.U. respectively, and are all within the green or yellow portions of the visible spectrum.

In Figure 2 of the drawing, there is shown a graphical representation that the peak emission of high silver and gallium containing phosphors prepared in accord with the present invention as a function of the percentage of the silver-gallium sulfide fired with the zinc sulfide. As may be seen from Figure 2, the total emission of these phosphors varies from approximately 5300 A.U. at 0.6 mole percent of silver-gallium sulfide to approximately 5800 A.U. at approximately 10 mole percent of silver-gallium sulfide. Phosphors prepared in accord with the present invention possess a number of advantages. Since the phosphor is prepared by firing two compounds together in a reducing atmosphere in the absence of water or oxygen containing compounds, no oxides are formed within the phosphor and hence any deleterious effects which may be produced by the presence of oxides in zinc sulfide phosphors are completely absent. Additionally, as mentioned hereinbefore, since silver-gallium sulfide is soluble in zinc sulfide to the extent of 10 mole percent $AgGaS_2$, greater concentrations of silver and gallium are attained than have been obtainable heretofore. Because of the high concentration of silver and gallium within the phosphors utilizing 0.6 to 10 mole percent of silver gallium sulfide, the wavelength of the emission of these phosphors is higher than any wavelength heretofore attainable from silver and gallium activated zinc sulfide phosphors.

Additionally, since the emission spectra of these phosphors possess only a single peak which is relatively sharp, the phosphors possess a relatively pure emission highly desirable in cathode ray applications, particularly in color television.

A further advantage of the preparation of silver and gallium activated zinc sulfide phosphors in accord with the present invention is the relative certainty that silver and gallium are present within the resultant phosphor in equal proportions. This is possible because silver and gallium are present in stoichiometric quantities within the silver-gallium sulfide, one mole of which contains one gram-atom of each. Thus, an equal concentration of atoms of silver and gallium are present within the resultant phosphors.

The advantages of the phosphors prepared in accord with the present invention, are believed attributable to the firing of the silver-gallium sulfide together with zinc sulfide. These advantages may not be obtained if silver and gallium activated zinc sulfide phosphors are formed by firing of other materials with zinc sulfide. Thus, for example, if silver and gallium are added to zinc sulfide as oxides, nitrates or sulfates, it is certain that these results would not be obtainable, since these gallium salts are not readily converted to gallium sulfide to form silver-gallium sulfide. Therefore, high concentrations of gallium cannot be obtained by such methods.

The following examples of the practice of the present invention are given by way of example only and are not to be construed in a limiting sense.

*Example 1.*—Silver-gallium sulfide was prepared by mixing 6.194 grams of $Ag_2S$ and 6.190 grams $Ga_2S_3$. The mixture was ground and ball milled and, after ball milling, fired in a hydrogen sulfide atmosphere for 8 hours at approximately 800° C. After firing, the mixture had a yellowish-green body color and, under X-ray crystallographic analysis showed the tetragonal crystal structure, identifying it as silver-gallium sulfide. 20.9 grams of luminescent grade cubic zinc sulfide and 0.005 gram of silver-gallium sulfide, as prepared above, were mixed and ball milled for one hour. After ball milling, the mixed sulfides were fired in a hydrogen sulfide atmosphere for one hour at 900° C. After firing, the resultant products had a white body color and, under 3650 A.U. excitation, luminesced blue. Blue luminescence was also emitted when the phosphor was settled on a glass plate and assembled as the faceplate of a demountable cathode ray tube and excited by cathode rays.

*Example 2.*—Silver-gallium sulfide was prepared as in Example 1. 20.9 grams of luminescent grade cubic zinc sulfide was mixed with 0.05 gram of silver-gallium sulfide, as prepared as in Example 1, and ball-milled for one hour. After ball milling, the mixture was fired in a hydrogen sulfide atmosphere for one hour at 900° C. After firing, the phosphor had a whitish-green body color and, when irradiated by 3650 A.U. excitation, luminesced blue-green. Blue-green luminescence was also observed when excited by cathode rays as in Example 1.

*Example 3.*—Silver-gallium sulfide was prepared as in Example 1. 9.39 grams of luminescent grade cubic zinc sulfide was mixed with 0.2417 gram of silver gallium sulfide and ball-milled for one hour. The mixture was fired in a hydrogen sulfide atmosphere for one hour at 900° C. The resultant phosphor had a whitish-green body color, and under 3650 A.U. excitation, luminesced green. Green luminescence was also observed under cathode ray excitation as in Example 1.

*Example 4.*—Silver-gallium sulfide was prepared as in Example 1. 8.36 grams of luminescent grade cubic zinc sulfide was mixed with 1.039 grams of silver-gallium sulfide and ball-milled for one hour. After ball milling, the mixture was fired in hydrogen sulfide for one hour at a temperature of 900° C. The resultant phosphor had a greenish body color and, under 3650 A.U. excitation, luminesced yellow. Yellow luminescence was also observed when the phosphor was subjected to cathode ray excitation as in Example 1.

*Example 5.*—Silver-gallium sulfide was prepared as in Example 1. 7.32 grams of luminescent grade cubic zinc sulfide was mixed with 1.930 grams of silver-gallium sulfide and ball-milled for one hour. After ball milling, the mixture was fired in a hydrogen sulfide atmosphere for one hour at 900° C. The resultant phosphor had a greenish body color and under 3650 A.U. excitation luminesced yellow. Yellow luminescence was also observed when the phosphor was subjected to cathode ray excitation as in Example 1.

Luminescent phosphors as prepared in accord with the present invention may be incorporated into cathode ray tubes to form luminescent screens therefor. They are also useful in color television picture tubes. These phosphors are luminescent under cathode ray excitation and under ultra-violet excitation.

While the invention has been described hereinbefore with respect to specific examples and certain embodiments thereof, many changes and modifications will immediately become apparent to those skilled in the art. Accordingly, by the appended claims I intend to cover all such modifications and changes as fall within the true spirit and scope of the foregoing disclosure.

What I claim as new and desire to secure by Letters Patent of the United States is:

1. The method of preparing a luminescent phosphor which method comprises preparing a mixture containing 0.01 to 10 mole percent of silver-gallium sulfide, the remainder being cubic zinc sulfide, and firing said mixture in a reducing atmosphere at a temperature of 800° C. to 1000° C.

2. The method of preparing a luminescent phosphor which method comprises preparing a mixture containing 0.01 to 10 mole percent of silver-gallium sulfide, the remainder being cubic zinc sulfide, and firing said mixture in an atmosphere of hydrogen sulfide at a temperature of 800° C. to 1000° C.

3. The method of preparing a luminescent phosphor which method comprises preparing a mixture containing 0.01 to 10 mole percent of silver-gallium sulfide, the remainder being cubic zinc sulfide, and firing said mixture in an atmosphere of hydrogen sulfide at a temperature of 900° C. to 975° C.

4. The method of preparing a green-yellow emitting luminescent phosphor which method comprises preparing a mixture containing 0.6 to 10 mole percent of silver-gallium sulfide, the remainder being cubic zinc sulfide, and firing said mixture in a reducing atmosphere at a temperature of 800° C. to 1000° C.

5. The method of preparing a green-yellow emitting luminescent phosphor which method comprises preparing a mixture containing 0.6 to 10 mole percent of silver-gallium sulfide, the remainder being cubic zinc sulfide, and firing said mixture in a reducing atmosphere at a temperature of 900° C. to 975° C.

6. The method of preparing a green-yellow emitting luminescent phosphor which method comprises preparing a mixture containing 0.6 to 10 mole percent of silver-gallium sulfide, the remainder being cubic zinc sulfide, and firing the mixture in a hydrogen sulfide atmosphere at a temperature of 800° C. to 1000° C.

7. A green-yellow emitting luminescent phosphor consisting essentially of cubic zinc sulfide activated with 0.6 to 10 gram-atomic percent of silver and gallium, said silver and gallium being present in equal proportions.

8. A luminescent phosphor consisting essentially of cubic zinc sulfide activated with approximately 5 gram-atomic percent of silver and gallium, said silver and gallium being present in equal proportions.

References Cited in the file of this patent

UNITED STATES PATENTS

| | | |
|---|---|---|
| 2,623,859 | Kroger | Dec. 30, 1952 |
| 2,734,872 | Young | Feb. 14, 1956 |
| 2,743,237 | Froelich | Apr. 24, 1956 |
| 2,743,239 | Froelich | Apr. 24, 1956 |
| 2,743,240 | Froelich | Apr. 24, 1956 |

OTHER REFERENCES

Froelich: "Jour. Elect. Chem. Soc.," vol. 100 (1953), pages 496–507.